United States Patent
Schiesser

[15] 3,697,209
[45] Oct. 10, 1972

[54] APPARATUS FOR MANUFACTURING REINFORCED TUBINGS FROM PLASTIC MATERIALS

[72] Inventor: Walter Hugo Schiesser, Zurich, Switzerland

[73] Assignee: Schiesser AG, Zurich, Switzerland

[22] Filed: Sept. 16, 1969

[21] Appl. No.: 858,368

[30] Foreign Application Priority Data

Sept. 20, 1968    Austria......................9172/68

[52] U.S. Cl. ..................425/109, 264/173, 425/114, 425/133
[51] Int. Cl. .............................B29f 3/04, B29f 3/10
[58] Field of Search.........18/13 R, 13 D, 13 E, 13 H, 18/13 J, 13 K, 13 P, 13 S, 13 T, 14 G, 14 R, 14 P; 264/173; 138/138, 174

[56] References Cited

UNITED STATES PATENTS

| | | |
|---|---|---|
| 3,159,877 | 12/1964 | Orsini.........................18/13 H |
| 2,874,411 | 2/1959 | Berquist..............18/13 R UX |
| 3,405,426 | 10/1968 | Donald.......................18/13 H |
| 2,760,230 | 8/1956 | Van Riper..................18/13 H |
| 3,058,493 | 10/1962 | Moller.................18/13 H UX |
| 3,365,750 | 1/1968 | Donald....................18/14 P X |

Primary Examiner—J. Spencer Overholser
Assistant Examiner—Norman E. Lehrer
Attorney—Wood, Heron & Evans

[57] ABSTRACT

In the manufacturing of tubings from rubber or other plastic materials the steps of continuously extruding a first inner layer of the tubing wall in an extruder head over a guide serving to form the cavity of the tubing, continuously applying strand-like reinforcing material through feed passages onto the outer surface of the wall part forming in such way and still in plastic state and then coating this reinforced inner wall part by at least one further layer of a plastic substance, to thereby provide tubings containing a reinforcing lining in the wall material to give reinforcement against internal pressures.

5 Claims, 10 Drawing Figures

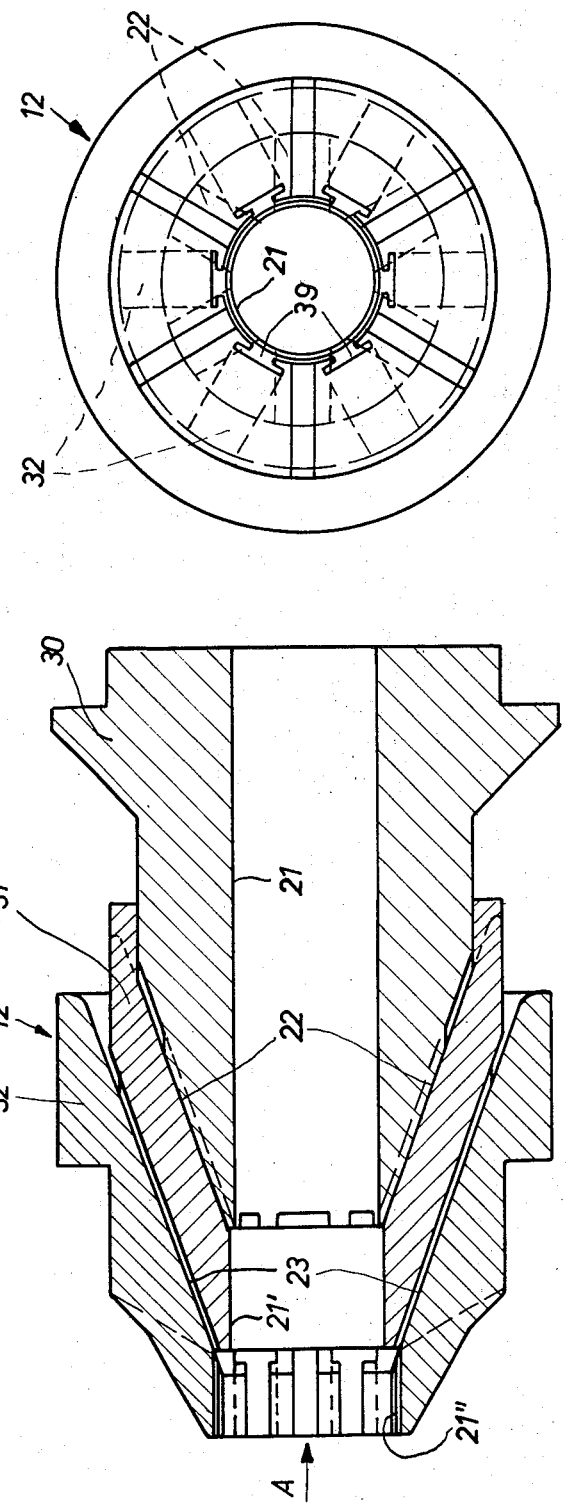

APPARATUS FOR MANUFACTURING REINFORCED TUBINGS FROM PLASTIC MATERIALS

The present invention relates to a method of manufacturing tubings from rubber or other plastic materials, which are provided with a reinforcing lining in the wall material to give reinforcement against internal pressures, as well as to an extruder head for carrying out the method.

Such tubings containing reinforcing linings or layers, particularly fabric-reinforced tubings, are today manufactured according to various conventional methods. The known methods for manufacturing such tubings require, however, a time-consuming, complicated and costly process of production and much preparation work. Moreover, corresponding mechanical equipment is necessary to this end. A main feature of the conventional processes of production is that a so-called core must firstly be extruded as tubing, on which a reinforcement or lining composed of fabric-ribbon or threads is applied in a separate working step and with special machines (ribbons with ribbon machine, braid with braider or weaving frames) and the outer tubing is then extruded, in a second stage, through a cross head by means of an extruder. This operation is repeated according to the desired number of fabric reinforcements or linings in the wall of the tubing. In order to obtain a good connection between ribbon or reinforcing thread, a glue solution must as a rule be spread on after these reinforcements have been applied. In most cases it is also necessary that the inner tubing (core) is fitted on a long metal core before passage through the machine applying the fabric reinforcements or linings.

It is clear that this fabrication, made up of many working stages, represents a time-consuming procedure and also involves correspondingly high costs.

It is an object of the present invention to provide a method which enables tubings containing reinforcing linings to be manufactured from rubber or other plastic materials in a single working stage, a subsequent vulcanization also being possible by a continuous vulcanizing process (e.g. salt bath, high frequency vulcanizing furnace etc.).

According to the present invention, the method is characterized in that a first inner layer of the tubing wall is continuously extruded in an extruder head over a guide serving to form the cavity of the tubing, in that strand-like reinforcing material is continuously applied in the longitudinal direction of the tubing on the outer surface of the wall part formed in this way and still in plastic state and the whole being then coated by at least one further layer of a plastic substance.

It is particularly advantageous if further strand-like reinforcing material is fed at approximately the same time as the extrusion of the plastic substance for the outer layer of the tubing wall, viz. at a greater radial distance from the center of the tubing than the first reinforcing material, whereby this further reinforcing material is embedded in the material of the outer layer of the tubing wall. In this way, two layers of the reinforcing or lining material are obtained. Ribbons made of textile material or even metal wires may advantageously be used as reinforcing material.

According to another object of the invention, the extruder head for carrying out the method consists of a housing having at least one connection for a plasticizing unit in which the means for forming the tubing are provided, is characterized in that the tubing forming means consist of a mouthpiece with a central bore, on whose inlet side is provided a first chamber from which plastic substance used for forming the inner tubing wall part is extruded into the annular space between the bore wall and a guide passing through the bore and serving to form the cavity of the tubing, in that feed channels for the strand-like reinforcing material pass through the mouthpiece body to the central bore, in that at least one further chamber is provided on the outlet side of the mouthpiece from which further plastic substance is extrudable onto the already formed tubing wall part, which chamber is closed on the side opposite the mouthpiece by a disc having a central bore, the central bore of the disc through which the means for forming the tubing cavity also pass, being arranged coaxially to that of the mouthpiece and serving to give the tubing its outer contour.

The guide serving to form the tubing cavity advantageously consists of a cylindrical core passing through the first chamber, the central bore of the mouthpiece and through the closure disc of the second chamber to the outlet of the extruder head.

An extruder head of this type is particularly advantageous in which the mouthpiece is provided with feed channels for ribbon- or thread-like reinforcing material, which channels pass through the bore wall into the central bore in two radial planes lying at a distance from one another, the channels of the second plane, observed in direction of transit of the tubing, opening into a section of the bore with an enlarged diameter.

The invention will be described in greater detail with reference to the accompanying drawings, in which:

FIG. 2 shows a longitudinal section, on an enlarged scale, through the mouthpiece of the extruder head alone;

FIG. 3 shows a view of the mouthpiece according to FIG. 2 in the direction of arrow A;

Figure 1:
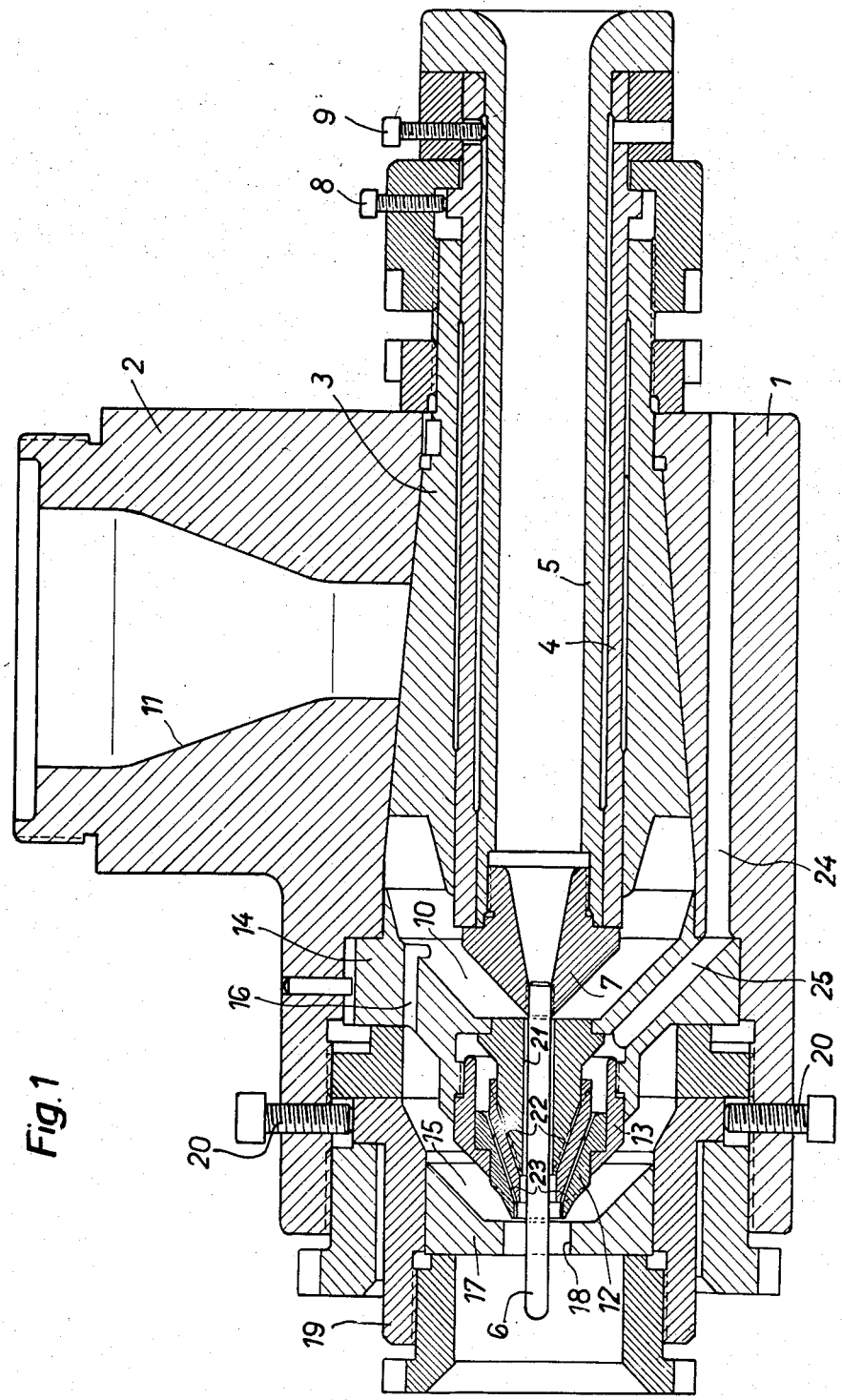
FIG. 1 shows a longitudinal section through an extruder head according to the invention.

Referring now to the drawings, FIG. 1 shows a cross extruder head for manufacturing tubings containing reinforcing layers. The extruder head is connectable to an extruder (not shown) by means of part 2 of its housing 1. In the rear part of the housing 1 is provided a cone 3 through which two interfitting excentric sleeves 4 and 5 pass forwardly. A core 6 having a conically shaped foot part 7 is screwed into the front end of the sleeve 5. The two excentric sleeves 4, 5, which are fixable by screws 8, 9, enable the core 6 to be radially adjustable to a certain degree, i.e., the inner tube part formed over the core 6 may be held exactly in center.

The core passes through a first chamber 10 which is connected via passages (not shown) with the material feed-in bore 11 of the part 2 of the housing. Adjacent this first chamber 10 is provided the mouthpiece 12, which is secured to a holder 14 by means of a sleeve 13. The mouthpiece 12 through which the reinforcing ribbons are fed, will be described in greater detail hereinbelow. A second chamber 15, which is connected with the chamber 10 via passages 16 of the ring 14, is located in front of the mouthpiece 12. A disc 17 having a central bore 18 is provided as closure for the chamber 15. This disc 17 gives the tubing its outer contour. The disc 17 is secured in a sleeve 19 and is adjustable in a radial plane by means of at least three screws 20 (only two of which have been shown). In this way, the outer tubing may be centered.

A first inner tubing wall part, the so-called inner tube, is formed between the core 6 and the wall of the longitudinal bore 21 of the mouthpiece 12, for which part of the plastic substance from the chamber 10 is used. Reinforcing ribbons are fed through a number of channels 22 which pass through the mouthpiece 12 at an angle with respect to the longitudinal axis thereof, in order to open into the bore 21 in a first radial plane, and said ribbons are applied on the continuously forming, forwardly passing inner tube.

More feed-channels 23 for reinforcing ribbons open into the bore 21, whose diameter is somewhat enlarged at this point, in a radial plane located somewhat further forward when observed in the direction of transit of the tubing. Somewhat at the same point, plastic substance will also penetrate from the chamber 15 into the space between the already formed inner tube and the wall of the enlarged bore 21 and the reinforcing ribbons emerging from the channels 23 are thus embedded. At the outlet of the mouthpiece, the last-named ribbons are again covered with more plastic substance and completely embedded therein.

In the housing 1 and ring 14, axial bores 24 or 25 are arranged to be relatively shifted in peripheral direction, through which the reinforcing ribbons can be fed to the channels 22 and 23. The channels 22 and 23 of the mouthpiece 12, as well as the bores 24, 25 are so arranged that the ribbons emerging on two different diameters (observed in cross-section of the bore 21 or of the forming tubing) lie uniformly shifted with respect to one another, i.e., the ribbons of the second layer lie above the spaces in the first layer of ribbons and thereby partly cover the ribbons of said first layer. Thanks to this arrangement, the plastic substance from the chamber 15 can penetrate thoroughly between and under the ribbons of the channels 23 and form an excellent connection with the inner tube which is still in a plastic state.

Figure 10:
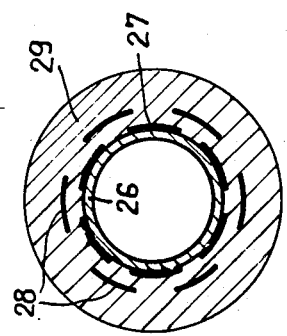
FIG. 10 shows purely schematically a cross-section through a tubing manufactured by means of the extruder head according to FIG. 1.

FIG. 10 of the drawing best shows what a tubing formed in this manner looks like. On the first layer of the tubing wall, i.e., the inner tube 26, are located six reinforcing ribbons 27 spaced uniformly with respect to one another. On a somewhat larger radius and exactly above the spaces between the ribbons 27, are provided six further reinforcing ribbons 28. Said ribbons are completely embedded in the substance 29 forming the outer part of the tubing. Such a simply manufactured tubing has a very high strength. All parts of the tubing are tightly connected together without the reinforcing layers having had to be specially prepared before.

Of course, the chambers 10 and 15 of the extruder head could be fed from two separate extruders, i.e., the chambers could be charged with different materials. This would enable a tubing to be manufactured in one working stage whose inner part could consist for example of oil-resistant material and whose outer part could consist for example of ozone-resistant material.

FIGS. 2-9 show the different individual parts of the mouthpiece 12.

As may best be seen from FIG. 2, the mouthpiece 12 consists of three parts, namely a rear, central and front part 30, 31 and 32 respectively.

Figure 5:
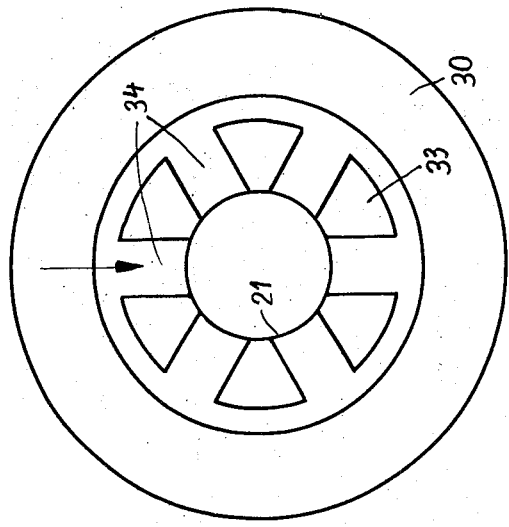
FIGS. 4–9 show different views, also on a larger scale and partly in section, of the individual parts of the mouthpiece.
Figure 4:
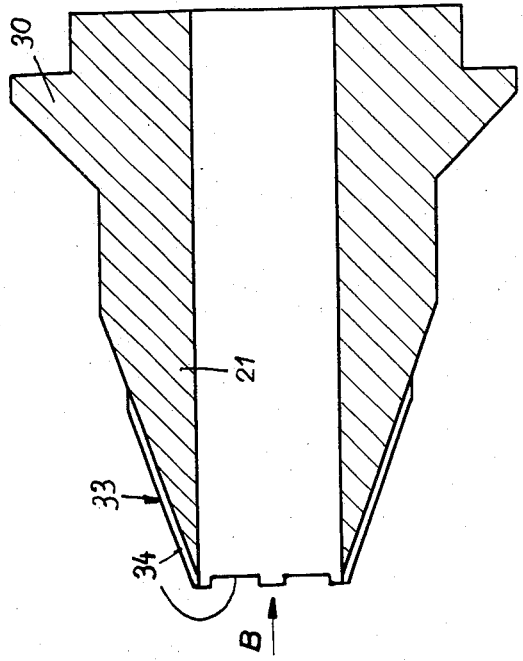

Six guide grooves 34 for reinforcing ribbons, are provided on the conical face 33 of the rear part 30 at a distance of 60° with respect to one another. The width of the grooves 34 is somewhat larger than the width of the ribbons themselves (see FIGS. 4 and 5, FIG. 5 showing a view in direction of arrow B of FIG. 4).

Figure 6:
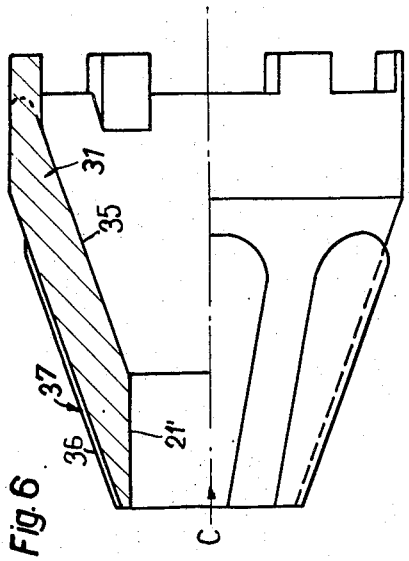
Figure 7:
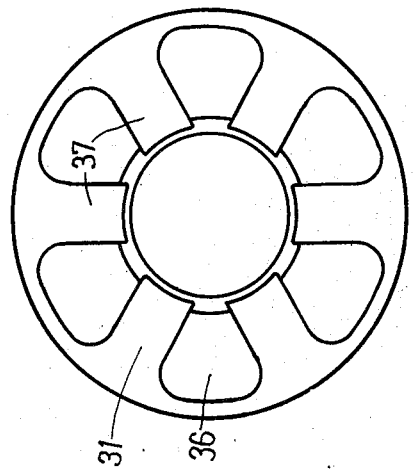

FIGS. 6 and 7 show the central part 31 of the mouthpiece 12, viz. FIG. 7 is a view in direction of arrow C of FIG. 6. The feed channels 22 for the inner layer of the reinforcing ribbons are formed in assembled state (see FIGS. 1, 2 and 3) between the conical face 35 of part 31 and the grooves 34 of the face 33 of the part 30. The section 21' of the bore of the part 31 forming a part of the longitudinal bore 21 has a diameter enlarged by about twice the thickness of the fed ribbons. Six further grooves 37 are provided on the likewise conical outer face 36 of the part 31. However, in assembled state, said grooves will be angularly off-set with respect to the grooves 34 of the part 30.

Figure 9:
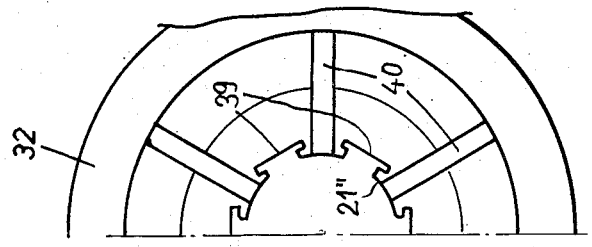
Figure 8:
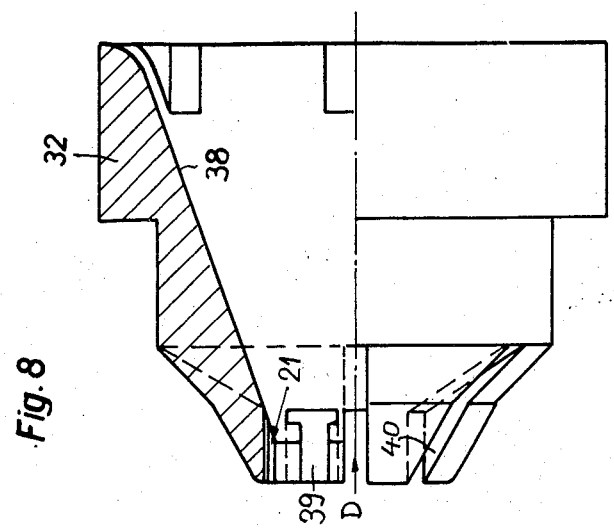

FIGS. 8 and 9 show the front part 32 of the mouthpiece 12, viz. FIG. 9 is a view in the direction of arrow D of FIG. 8. Here too, the feed channels 23 for the reinforcing ribbons of the second layer are formed in assembled state between the conical inner face 38 and the grooves 37 of part 31. In line with the channels 23 are provided guide grooves 39 in the section 21'' of the bore 21 whose diameter is once more enlarged, said grooves serving to guide the fed ribbons at a predetermined distance from the longitudinal axis. Furthermore, radial slots 40 pass between the grooves 39 into the bore part 21'', in order to allow plastic substance to penetrate between the inner tube and the ribbons of the channels or grooves 38, 39.

It is to be noted that more feed channels could of course be provided for strand-like reinforcing layers, in order for example to form a third reinforcing layer lying further to the outside as viewed radially.

Instead of the ribbon-shaped reinforcing material, wires or cords could also be used.

Of course, the number of feed channels may also be chosen as desired.

What I claim is:

1. An extruder for making strand reinforced tubing comprising:
   a mouthpiece having an inner wall defining a central bore with an inlet and an outlet end,
   a guide passing through said central bore to define therewith an annular tube-forming cavity having an entry and exit end,
   structure defining a first chamber, said first chamber communicating with said inlet end of said mouthpiece bore and containing plastic substance for partially forming said tube in said annular cavity when said plastic substance is input to said annular cavity from said first chamber via said inlet end, initiation of said partial tube formation being at a point intermediate said entry and exit ends of said annular cavity, said mouthpiece having feed channels intersecting said central bore inner wall and which has an output end communicating with said annular cavity at a location both between said entry and exit ends thereof and downstream of said intermediate point whereat said tube initiates formation, feed channels for ribbon- or thread-like reinforcing material, which channels pass through the bore wall into the central bore in two radial planes lying at a distance from one another, the channels of the second plane, observed in direction of transit of the tubing, opening into a section of the bore with an enlarged diameter, strand-like reinforcing material in said feed channel for feeding said reinforcing material onto the outer surface of said partially formed tube and thereby reinforcing it, and structure defining a second chamber, said structure including a disc having a central bore coaxial with said mouthpiece bore for giving said partially formed and reinforced tube an outer contour, said second chamber communicating with said exit end of said tube-forming annular cavity and with said disc bore, said guide also passing through said disc bore.

2. An extruder head as claimed in claim 1 comprising front, central, and rear sleeves fitting inside one another on conical interfitting surfaces, recesses being provided in the interfitting surfaces between the rear and central sleeve and between the front and central sleeve for forming the said feed channels.

3. An extruder head as claimed in claim 1, wherein the said feed channels consist of passages passing into the central bore and distributed uniformly over the periphery of the mouthpiece, the passages of the second plane being arranged in off-set relationship with respect to those of the first plane.

4. An extruder head as claimed in claim 3, wherein $n$ feed channels open into the central bore in each of the said radial planes at an angular distance of $360°/n$, and wherein the angular distance, observed in the longitudinal direction of the bore, amounts to $360°/2n$ between the channels of both planes.

5. An extruder head as claimed in claim 1, wherein there are provided slots in the section of the mouthpiece with enlarged bore, through which plastic substance from the second chamber can penetrate into this enlarged section in order to surround the strand-like reinforcing material of the channels of the second plane.

* * * * *